Oct. 11, 1932.  S. R. FETNER  1,882,129
INNER LINER FOR TIRE CASINGS
Filed Aug. 19, 1931   2 Sheets-Sheet 1
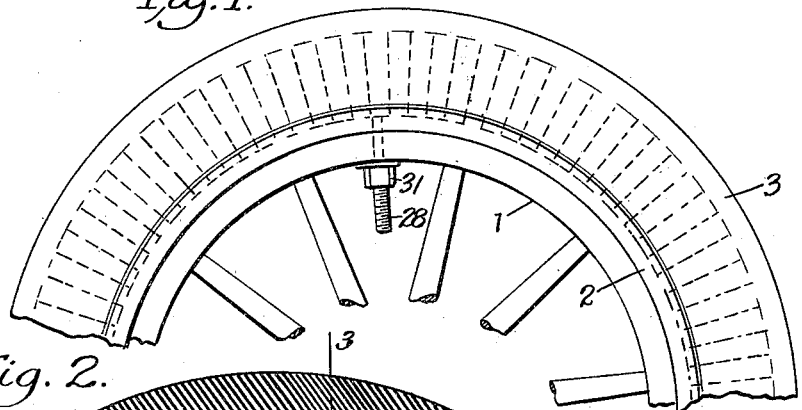
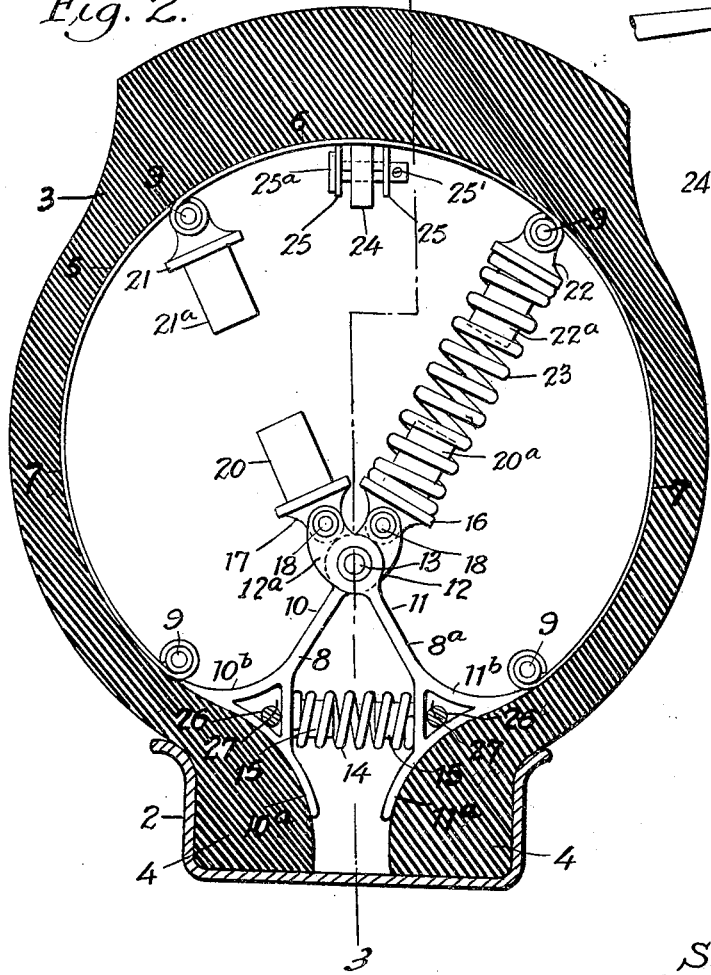
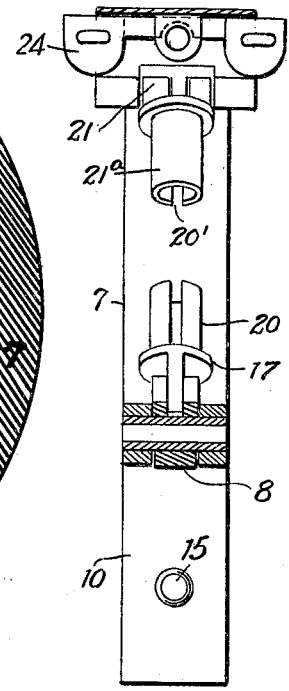
Inventor:
S. R. Fetner,
By
Attorney.

Oct. 11, 1932.   S. R. FETNER   1,882,129
INNER LINER FOR TIRE CASINGS
Filed Aug. 19, 1931   2 Sheets-Sheet 2
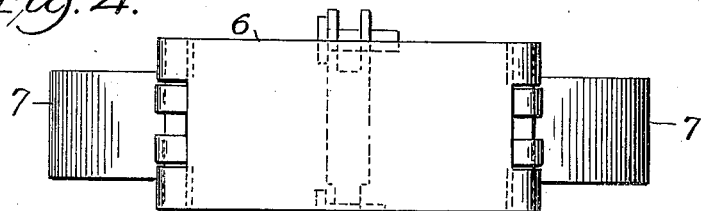
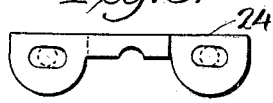
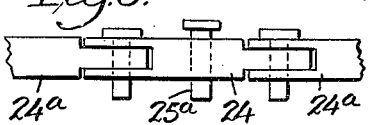
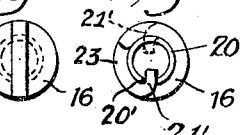
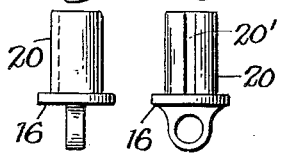
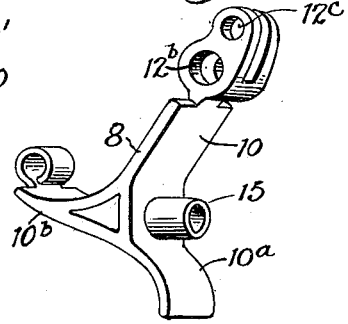
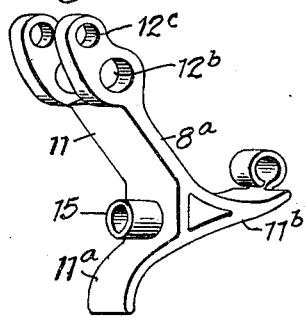
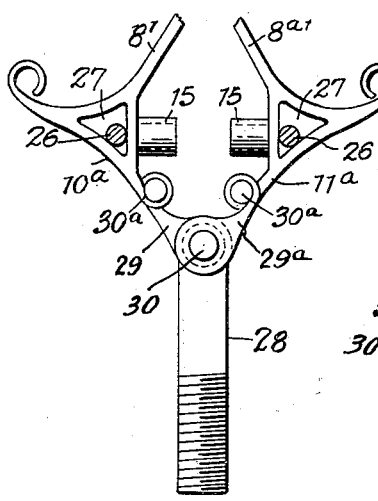
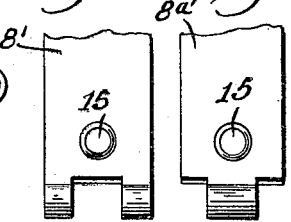
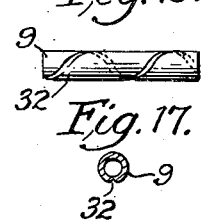
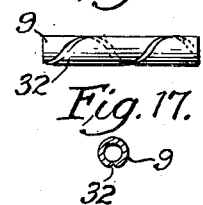
Inventor:
S. R. Fetner,
Byial
Attorney.

Patented Oct. 11, 1932

1,882,129

UNITED STATES PATENT OFFICE

STEPHEN R. FETNER, OF JACKSONVILLE, FLORIDA

INNER LINER FOR TIRE CASINGS

Application filed August 19, 1931. Serial No. 558,138.

This invention relates to a resilient core or inner liner or frame adapted for use in place of an air-inflated inner tube within the casing or shoe of a rubber automobile tire to keep the tire casing elastically distended and to allow cushioning or shock absorbing actions of the tire corresponding to those afforded by the use of an inflated inner tube without the disadvantages attendant upon the use of such tube.

In my prior application for patent filed October 18, 1930, Serial No. 489,674, I have disclosed a core or inner liner or frame of this character which will hold the shoe securely to the rim while resiliently backing the shoe and permitting cushioning movements thereof; which is adapted to be easily applied and removed; which will not be affected by shoe punctures and will therefore form, in effect, with the shoe a puncture proof tire; and which, while overcoming the disadvantages of an air-inflated inner tube, will outlast many successive tubes, and thereby may be indefinitely used and afford economy over the present practice of employing such tubes.

The object of the present invention is to provide a device of the stated character which simplifies and improves the construction and generally increases the efficiency of the device.

The invention consists of the features of construction, combination and arrangment of parts, hereinafter more fully described and claimed, reference being had to the accompanying drawings, in which:—

Fig. 1 is a side elevation showing an automobile wheel equipped with a tire embodying my invention.

Fig. 2 is a cross-section through the rim and tire.

Fig. 3 is a central section taken circumferentially of the wheel as on the line 3—3 of Fig. 2 through one of the core, liner or frame units.

Fig. 4 is a plan view of one of the jointed resilient band units.

Fig. 5 is a side view of one of the link connectors.

Fig. 6 is a plan view of the same and the ends of links connected thereby.

Figs. 7 and 8 are, respectively, top and bottom plan views of one of the spring supporting saddle brackets, Fig. 8 also showing the engagement of a cushioning spring therewith.

Figs. 9 and 10 are opposite side elevations thereof.

Figs. 11 and 12 are perspective views of the rim sections of the liner or frame unit.

Fig. 13 is a view of a pair of rim sections associated with a stem to prevent creeping.

Figs. 14 and 15 are inner face views of the rim sections shown in Fig. 13.

Fig. 16 is a side view of one of the pivot pins.

Fig. 17 is a cross-section of the same.

Fig. 18 is a plan view of the stem and associated pivoted links shown in Fig. 13.

Referring now more particularly to the drawings, 1 designates the felly of a wheel, to which is secured a channeled rim 2 carrying the tire casing or shoe 3. This shoe or casing 3 may be of an ordinary type, split at the rim side and formed to provide the flanges 4 to seat within the rim.

The resilient inner core, liner or frame embodying my invention is adapted to fit within the shoe, and comprises an annular series of resilient units interlinked so that at any point of compression of the tread of the shoe a plurality of units will absorb the shock of compression. Each unit consists of a jointed spring metal band 5 shaped to fit the inside of the shoe and formed of a tread section 6, opposite side sections 7, and opposite base or rim sections 8, $8^a$ and $8'$, $8^{a'}$, united at their adjacent ends by pivot pins or members 9 of a construction hereinafter described. The band sections 6 and 7 are preferably made of spring sheet steel of suitable gage, while the sections 8, $8^a$ and $8'$, $8^{a'}$ are castings, preferably of some suitable spring metal.

The sections 8, $8^a$ and $8'$, $8^{a'}$ are curved on their rim sides to fit the inner surfaces of the flanges 4 and parts of the side walls of the shoe adjacent thereto, and said sections 8, $8^a$ include outer arms 10, 11, inner arms $10^a$, $11^a$, and lateral arms $10^b$, $11^b$. The arms 10, 11 of the two sections 8, $8^a$ are formed with forked ends respectively providing pairs of knuckles 12, $12^a$ having sets of openings or eyes $12^b$ and $12^c$, said knuckles being crossed and the openings 12ᵇ therein receiving a pivot pin 13, whereby said sections are pivotally coupled to permit them to move laterally and thus adapt the band to expand and contract in a lateral direction on compression of the shoe and its reaction and return to normal condition. The arms 10ᵃ, 11ᵃ bear against the inner faces of the flanges 4 and operate as spreading and clamping members acting to transmit thereto the spreading pressure of a spring 14 to hold the flanges 4 pressed against the sides of the rim and to thereby maintain the tire in position. The spring 14 engages studs 15 arranged on the inner faces of the sections 8, 8ᵃ between the sets of arms 10, 11 and 10ᵃ, 11ᵃ. By this means the flanges 4 will be held securely seated in the rim channel, while, whenever desired, by means of a suitable tool inserted between one of the flanges 4 and the adjacent side of the rim, the engaged flange 4 may be forced toward the other flange 4, thus contracting the rim side of the shoe, in which operation the spring 14 will be compressed, to allow the shoe to be unseated from the rim.

Saddle brackets 16 and 17 are pivoted to the knuckles 12, 12ᵃ by pivot pins 18 engaging openings in the brackets and the openings 12ᶜ in the sections 8, 8ᵃ, whereby said sections 8, 8ᵃ and the brackets are coupled for lateral pivotal movements. The brackets carry fixed holding studs 20, 20ᵃ, which diverge outward radially toward coactive inwardly converging holding studs 21ᵃ, 22ᵃ carried by brackets 21, 22 pivoted for lateral swinging movements to the tread band section 6 equidistantly on opposite sides of the center of the tire. Coiled springs 23, (one of which is shown) engage the respective sets of studs 20, 21ᵃ, 20ᵃ, 22ᵃ, and are adapted to sustain the compression shocks on the tread of the shoe, to permit cushioning movement of the tread when so subjected to compression, and to at all other times hold the shoe expanded. The studs are provided with longitudinal slots or grooves 20′ to receive angularly bent end portions 21′ of the springs whereby the studs and springs, in the manner illustrated in Fig. 8, are properly guided and the springs held against rotation on the studs.

The resilient band units are connected and held assembled at the tread point by link connectors or couplers 24 and link bars 24ᵃ. Each link connector extends across the tread center of section 6 and is centrally pivoted to ears 25 formed on said section and has its oppositely projecting ends pivoted to the ends of the link bars of adjacent bands by headed pins 25ᵃ held from displacement by cotter pins 25′, as clearly shown in Fig. 2. At the tread side the units are connected at opposite sides by elastic band cords 26 passing through retaining openings 27 in the sections 8, 8ᵃ, and operating to hold the parts yieldingly united at this point.

A resilient core, liner or frame so constructed may be easily slipped inside a tire shoe and applied with the shoe to the rim, the sections 10, 10ᵃ and 10ᵃ′ and 11ᵃ′ yielding inwardly under pressure to permit the flange 4 of the shoe to enter the rim and then being pressed outwardly to hold the flanges firmly in the rim. The core so applied will resiliently back the shoe and expand and contract therewith and absorb all shocks and jars as effectually as an inflated inner tube, without the disadvantages of the latter.

Suitable devices, one or more, may be employed to hold the core or liner against creeping in the shoe. I have shown one of such devices comprising a stem 28 passing through the felly and rim and into the tire and pivoted at its inner end by a headed pivot pin 30 to links 29 and 29ᵃ, which are in turn pivoted by similar pivot pins 30ᵃ to the clamping arms 10ᵃ′ and 11ᵃ′ of rim section 8′, 8ᵃ′ similar to sections 8, 8ᵃ except that the arms 10ᵃ′ and 11ᵃ′ are provided with eyes or openings to receive the pins 30. The outer end of the stem projects radially inward of the rim, like a valve stem of a pneumatic tire, and is threaded to receive a nut 31 whereby the stem may be fastened to the rim or released for withdrawal from the rim with the tire. The pivot pins may be held from displacement by keys or retaining pins 30′, as shown, for example, in Fig. 18, in connection with pin 30.

The pivot pins 9 and 18 are preferably of the type shown in Figs. 16 and 17 in which the pin is shown as formed with a spiral groove 32 to receive a lubricant of a suitable sort which will keep the surfaces of the parts lubricated, and prevent squeaking, for a very lengthy period. Other means for the same purpose may be employed.

From the foregoing description, taken in connection with the drawings, the construction, operation and advantages of my improved resilient tire core will be readily understood and appreciated without a further and extended description. While the construction disclosed is preferred, it will, of course, be understood that changes in the form, proportion and details of construction of the parts may be made within the scope of the appended claims without departing from the spirit or sacrificing any of the advantages of the invention.

What I claim is:—

1. An automobile tire comprising an outer elastic tire casing, and a resilient core, inner lining or frame therein consisting of an annular series of linked units, each composed of a resilient transverse band formed of tread, rim and side sections yieldingly backing the shoe, pivot pins connecting the tread and side sections, a pivot pin connecting the rim sections, compression springs between the rim sections and other sections on opposite sides of the longitudinal center of the tread of the tire, and supports for the inner and outer ends of said springs respectively pivoted to the pivot pins uniting the tread and side sections and to the pivotally connected ends of the rim sections independent of the pivot pin connecting the same.

2. An automobile tire comprising an outer elastic tire casing, and a resilient core, inner lining or frame therein consisting of an annular series of linked units, each composed of jointed tread, rim and side sections, the rim sections having crossed and pivotally connected end portions, supports independently pivoted to the said crossed end portions of the rim sections beyond the pivotal connection thereof, supports pivoted to the core on opposite sides of the longitudinal center of the tread of the tire, and compression springs carried by said supports.

3. An automobile tire comprising an outer elastic tire casing, and a resilient core, inner lining or frame therein consisting of an annular series of linked units, each composed of tread, rim and side sections, the rim sections having crossed end portions, pivot pins uniting the tread and side sections, outer supports hinged to said pivot pins, a pivot pin connecting the crossed end portions of the rim sections, inner supports hinged to the crossed end portions of the rim sections independently of each other and of said pivot pin, and compression springs carried by said supports.

4. An automobile tire comprising an outer elastic tire casing, and a resilient core, inner lining or frame therein consisting of an annular series of linked units, each composed of tread, rim and side sections, the rim sections having crossed end portions, pivot pins uniting the tread and side sections, outer supports hinged to said pivot pins, a pivot pin connecting the crossed end portions of the rim sections, inner supports hinged to the crossed end portions of the rim sections independently of each other and of said pivot pin, compression springs between the rim sections, and compression springs carried by said supports.

5. An automobile tire comprising an outer elastic tire casing, and a resilient core, inner lining or frame therein consisting of an annular series of linked units, each composed of jointed tread, rim and side sections, the rim sections having crossed and pivotally connected end portions, supports independently pivoted to the said crossed end portions of the rim sections beyond the pivotal connection thereof, supports pivoted to the core on opposite sides of the longitudinal center of the tread of the tire, compression springs between the rim sections, and compression springs carried by said supports.

In testimony whereof I affix my signature.

STEPHEN R. FETNER.